United States Patent [19]

Isa et al.

[11] 3,883,587

[45] May 13, 1975

[54] PROCESS FOR MANUFACTURING POLYOL ESTERS OF CARBOXYLIC ACID

[75] Inventors: Hiroshi Isa, Funabashi; Takeo Inagaki, Yachiyo; Yasuhiro Kiyonaga, Narashino; Masuzo Nagayama, Tokyo, all of Japan

[73] Assignee: Lion Fat & Oil Co., Ltd., Tokyo, Japan

[22] Filed: Dec. 6, 1973

[21] Appl. No.: 422,578

[30] Foreign Application Priority Data

Dec. 11, 1972 Japan.............................. 47-124646

[52] U.S. Cl............................. 260/410.6; 260/410.7
[51] Int. Cl.............................. 260 497; C07c 67/00
[58] Field of Search....... 260/410.6, 497 C, 410.9 R

[56] References Cited

UNITED STATES PATENTS 3,507,891    4/1970    Hearne et al. .................... 260/410.9

FOREIGN PATENTS OR APPLICATIONS 2,023,690    10/1970    Germany

*Primary Examiner*—Donald G. Daus
*Assistant Examiner*—Diana G. Rivers
*Attorney, Agent, or Firm*—Woodhams, Blanchard and Flynn

[57] ABSTRACT

A process for manufacturing polyol esters of carboxylic acid, characterized by heating olefin having 4–30 carbon atoms, carbon monoxide and polyhydric alcohol at elevated pressures and in the presence of a first catalyst containing cobalt, nickel or rhodium and a second catalyst consisting of pyridine or its derivatives to react therewith, removing the unreacted carbon monoxide, and heating again the reaction system.

8 Claims, No Drawings

PROCESS FOR MANUFACTURING POLYOL ESTERS OF CARBOXYLIC ACID

BACKGROUND OF THE INVENTION a. Field of the Invention

This invention relates to a process for manufacturing polyol ester of carboxylic acid from olefin, carbon monoxide and polyhydric alcohol with a high yield.

b. Description of the Prior Art

Polyol esters of carboxylic acids which have wide application as lubricants, plasticizers, cosmetic raw materials, and surfactants have been ordinarily produced by the reaction of natural fatty acids with polyhydric alcohols. However, the distribution of the carbon chain length in natural fatty acids is biased, and there is only a small quantity of fatty acids having $C_6$–$C_{10}$ which are important as a raw material for use in aviation lubricants and thermoresistant plasticizers. Esterification of synthetic fatty acids has been noticed because of the stable supply thereof.

There are some processes for manufacturing synthetic fatty acids, such as the Reppe process and Koch process using a starting olefin material, and the paraffin oxidation process using a starting paraffin material, but in either process a branched fatty acid is obtained as by-product. The branched fatty acid has a reactivity so much lower than the linear fatty acid that it requires a considerably complicated procedure for completing esterification thereof with a polyhydric alcohol. Thus it is difficult to produce polyol esters of carboxylic acid directly from such fatty acid.

For simplifying the process, it is attempted to produce polyol esters of carboxylic acid directly from an olefin, which is a starting material preparing fatty acids, and carbon monoxide, but there has been no application of this process for polyhydric alcohols. The monohydric alcohol used in this process is a lower alcohol such as methanol and ethanol, and it is recognized that if the conditions for esterifying such monohydric alcohol is applied to esterification of a polyhydric alcohol, the yield is not high enough to be employed in a process commercially.

SUMMARY OF THE INVENTION

This invention is based on the above-described concept, and it provides a process for manufacturing polyol esters of carboxylic acids, characterized by heating olefin having 4 to 30 carbon atoms, carbon monoxide, and polyhydric alcohol at elevated pressures and in the presence of a first catalyst containing cobalt, nickel or rhodium and a second catalyst consisting of pyridine or its derivatives to react therewith, removing the unreacted carbon monoxide, and heating again the reaction system.

The olefin used herein is α- or inner-olefin having 4 to 30 carbon atoms; for example, there can be mentioned hexene-1, octene-1, tetradecene-3, hexene-2 and their analog compounds, and mixtures thereof are also useful. Any polyhydric alcohol may be useful, such as ethylene glycol, trimethylol propane, pentaerythritol, glycerin, diethylene glycol, propylene glycol, butane diol, pentane diol, dipentane erythritol, neopentyl glycol, and their analog compounds. The ratio of olefin to polyhydric alcohol is almost equal stoichiometrically according to the purpose of end products, it is preferable to use a stoichiometric excess of olefin for esterifying all hydroxyl groups of the polyhydric alcohol.

Some amount of hydrogen, as an impurity, may be allowed to exist the carbon monoxide, but more than 10 percent by volume of the impurity is not preferable because it increases of impurities in the produced ester. The quantity of carbon monoxide is stoichiometrically in excess relative to olefin.

The reaction pressure is higher than 60 kg/cm², preferably higher than 90 kg/cm², but elevation of the pressure in the range higher than 300 kg/cm² is.

As a cobalt-containing catalyst, such compounds are effective which produce dicobalt octacarbonyl in the reaction system or form dicobalt octacarbonyl, cobaltcarbonyl hydride or its derivatives under the reaction conditions: as such compounds there are cobalt octanoate, cobalt stearate, cobalt hydroxide and their analog compounds such as cobalt oxide, cobalt chloride, cobalt oxalate, and cobalt carbonate. The ratio of the cobalt-containing catalyst to olefin is 0.001–0.1 mol/mol, and preferably 0.002–0.05 mol/mol.

As a nickel- or rhodium-containing catalyst, there may be used similar compounds as in the case of the cobalt-containing catalyst and its quantity is also similar to the case of the cobalt-containing catalyst; for example, there are as the nickel-containing catalyst, nickel stearate, nickel hydroxide, and their analog compounds such as nickel octanoate, nickel oxide, nickel chloride, nickel naphthenate, and nickel carbonate; as the rhodium-containing catalyst there are rhodium octanoate, rhodium stearate, rhodium hydroxide, and their analog compounds such as rhodium chloride, rhodium nitrate and rhodium sulfate.

As pyridine or its derivatives, there are pyridine, β-picoline, γ-picoline, 3,5-lutidine, 4-ethylpyridine and their analog derivatives such as 4-propylpyridine, 3,5-diethylpyridine, and 4-vinylpyridine. The quantity of pyridine or its derivatives is preferably in the range of 3–30 mol/mol and more preferably 3–15 mol/mol.

It is more effective in the present invention to allow water to exist in the reaction system; the quantity of water in this case is usually more than 0.02 mol/mol, preferably 0.05 mol/mol, but it is not desirable to use too much water for it results in delay of reaction. The most preferably quantity is 0.05–2.0 mol/mol relative to olefin. The water may be substituted by a compound that reacts with alcohol to produce water in the reaction system, such as fatty acid of the raw material. If the quantity of the water or fatty acid present at the end of the first step is not within the above-described range, an additional quantity of it may be added again before re-heating.

The reaction temperature in the first step is higher than 90°C and preferably 90°–250°C since a catalyst is decomposed at a temperature higher than 250°C. After the end of the reaction, excess carbon monoxide is removed and the system is heated again; the temperature in the second step is 60°–300°C, preferably 100°–250°C. Though any reaction pressure in this case may be selected, atmospheric or reduced pressure is preferable in the economical view. Re-heating may be performed immediately after the end of reaction, but it is preferable to heat again after distilling off substances of lower boiling points such as unreacted olefin and bases, as the reaction temperature can be easily elevated under atmospheric or reduced pressure.

In conventional processes fatty acid is once produced from olefin and is allowed to react directly with alcohol in the presence of an acid catalyst, or fatty acid is esterified through an acid chloride; on the contrary, in the process of this invention, the ester can be obtained directly from the olefin, not via fatty acid, and thus the process can be greatly simplified. In ordinary processes, when branched fatty acid is contained, it is difficult to produce an ester containing branched chain by direct esterification of fatty acid and alcohol; but in the process of this invention, such an ester can be easily produced. According to the process of this invention, the conversion of hydroxyl groups is high and consequently polyol ester of carboxylic acid can be obtained with high purity and high yield, compared with the process wherein olefin, carbon monoxide and polyhydric alcohol are compressed and heated merely in the presence of a cobalt-containing catalyst and a catalyst consisting of pyridine or its derivatives.

The invention is explained, as referring to some examples and comparative example.

DESCRIPTION OF THE PREFERRED EMBODIMENTS

Comparative Example 1 (An application of a conventional process for polyhydric alcohol)

In a 300 ml. stainless steel autoclave were placed, 0.65 mol of octene, 0.167 mol of trimethylol propane, 0.016 mol of cobalt octanoate and 0.24 mol of γ-picoline and they were allowed to react under the pressure of carbon monoxide 150 $kg/cm^2$ at 160°C for 8 hours. From the reaction mixture the catalyst, γ-picoline, and unreacted olefin were removed, and the product was analyzed to find that triester was 38 percent of the whole.

EXAMPLE 1

In a 300 ml. stainless steel autoclave, were placed 0.65 mol of octene-1, 0.167 mol of trimethylol propane, 0.016 mol of cobalt octanoate, 0.24 mol of γ-picoline and 0.1 mol of water, and they were allowed to react under the pressure of carbon monoxide 150 $kg/cm^2$ at 160°C for 5 hours. After removing carbon monoxide from the reaction mixture, the system was again heated under atmospheric pressure at 160°C for 3 hours; in this step a predominant part of γ-picoline and unreacted olefin were distilled off. After removing the catalyst from the reaction mixture, the product was analyzed to find that triester was 99.5 percent of the whole.

EXAMPLE 2

In the place of 0.016 mol of cobalt octanoate, there was used 0.008 mol of dicobalt octacarbonyl, and the same operation as described in Example 1 was performed. Triester was 99.6 percent of the whole.

EXAMPLE 3

In a 300 ml. stainless steel autoclave, were placed 0.65 mol of hexene mixture, 0.167 mol of glycerin, 0.002 mol of dicobalt octacarbonyl, 0.12 mol of γ-picoline, and 0.5 mol of water, and they were allowed to react under the pressure of carbon monoxide 200 $kg/cm^2$ at 180°C for 8 hours. After removing carbon monoxide from the reaction mixture, the system was heated under normal pressure at 120°C for 4 hours. In this step γ-picoline and unreacted olefin were predominantly distilled off. After removing the catalyst from the reaction mixture, the product was analyzed to find that triester was 99.3 percent of the whole.

EXAMPLE 4

In a 300 ml. stainless steel autoclave, were placed 0.55 mol of octadecene-1, 0.25 mol of ethylene glycol, 0.016 mol of cobalt octanoate, 0.30 mol of pyridine, and 0.1 mol of nonadecanoic acid, and they were allowed to react under the pressure of carbon monoxide 120 $kg/cm^2$ at 140°C for 8 hours. After removing carbon monoxide, the system was heated again under normal pressure at 140°C for 4 hours. In this step pyridine and unreacted olefin were predominantly distilled off. After removing the catalyst from the reaction mixture, the product was analyzed to find that diester was 98.1 percent of the whole.

EXAMPLE 5

In a 300 ml. of stainless steel autoclave were placed 0.65 mol of decene-1, 0.13 mol of pentaerythritol, 0.008 mol of dicobalt octacarbonyl, 0.24 mol of 3,5-lutidine and 0.1 mol of water, and they were allowed to react under the pressure of carbon monoxide 150 $kg/cm^2$ at 160°C for 5 hours. After removing carbon monoxide from the reaction mixture, the system was heated again under reduced pressure of 100 mmHg at 200°C for 3 hours. In this step 3,5-lutidine and unreacted olefin were predominantly distilled off. After removing the catalyst from the reaction mixture, the product was analyzed to find that tetraester was 99.5 percent of the whole.

EXAMPLE 6

In a 300 ml. of stainless steel autoclave, were placed 0.65 mol of octene-1, 0.167 mol of trimethylol propane, 0.016 mol of cobalt octanoate, and 0.24 mol of γ-picoline, and they were allowed to react under the pressure of carbon monoxide 150 $kg/cm^2$ at 160°C for 5 hours. After removing carbon monoxide from the reaction mixture, the system was heated again under normal pressure at 160°C for 3 hours. In this step, γ-picoline and unreacted olefin were predominantly distilled off. After removing the catalyst from the reaction mixture, the product was analyzed to find that triester was 73 percent of the whole.

Comparative Example 2

In a 300 ml. of stainless steel autoclave, were placed 0.65 mol of octene-1, 0.167 mol of trimethylol propane, 0.016 mol of cobalt octanoate, 0.24 mol of γ-picoline and 0.1 mol of water, and they were allowed to react under the pressure of carbon monoxide 150 $kg/cm^2$ at 160°C for 5 hours. After removing the catalyst and γ-picoline and unreacted olefin from the reaction mixture, the product was analyzed to find that triester was 62 percent of the whole.

What is claimed is:

1. In a process for preparing polyol esters of carboxylic acids, comprising reacting an olefin having from 4 to 30 carbon atoms and a polyhydric alcohol, wherein the molar ratio of said olefin to the reactive hydroxyl groups of said polyhydric alcohol is about 1/1 or more, with an excess of carbon monoxide at a pressure in the range of from 60 to 300 $kg/cm^2$, the reaction being carried out at a temperature of from 90° to 250° C., in the presence of a first catalyst of cobalt, nickel or rhodium, and a second catalyst of pyridine or a derivative of pyridine, and removing carbon monoxide to produce an intermediate reaction product containing the unreacted polyhydric alcohol, the improvement which comprises the step of:

reheating said intermediate reaction product containing the unreacted polyhydric alcohol to a temperature of from 60° to 300°C. without distilling off the unreacted polyhydric alcohol for a period of time effective to complete the conversion of hydroxyl groups in said polyhydric alcohols to ester groups whereby to obtain polyol ester of carboxylic acid at a high purity and a high yield.

2. A process as claimed in claim 1, in which in said reheating step said intermediate reaction product is heated to from 100° to 250° C.

3. A process as claimed in claim 2, wherein the pressure in the reheating step is atmospheric pressure or reduced pressure.

4. A process as claimed in claim 1, wherein the first catalyst is selected from a group consisting of cobalt octanoate, cobalt stearate, cobalt hydroxide, cobalt oxide, cobalt chloride, cobalt oxalate, cobalt carbonate, nickel octanoate, nickel stearate, nickel hydroxide, nickel oxide, nickel chloride, nickel naphthenate, nickel carbonate, rhodium stearate, rhodium hydroxide, rhodium chloride, rhodium nitrate and rhodium sulfate, and the second catalyst is selected from the group consisting of pyridine, $\beta$-picoline, $\gamma$-picoline, 3,5-lutidine, 4-ethylpyridine, 4-propylpyridine, 3,5-diethylpyridine and 4-vinylpyridine.

5. A process as claimed in claim 1, wherein the amount of the first catalyst is 0.001–0.1 mol/mol of olefin and the amount of the second catalyst is 3 to 30 mol/mol of the first catalyst.

6. A process as claimed in claim 1, wherein water is added to the reaction system.

7. A process as claimed in claim 6, wherein the amount of water is 0.02–2.0 mol/mol of olefin.

8. A process as claimed in claim 1, in which said polyhydric alcohol is selected from the group consisting of ethylene glycol, trimethylol propane, pentaerythritol, glycerin, diethylene glycol, propylene glycol, butane diol, pentane diol, dipentane erythritol and neopentyl glycol.

* * * * *